(12) United States Patent
Richman et al.

(10) Patent No.: US 9,667,904 B2
(45) Date of Patent: May 30, 2017

(54) MANAGING EXTRA SPACE ON ULTRA HIGH DEFINITION DISPLAY PRESENTING HIGH DEFINITION VIDEO

(71) Applicant: SONY CORPORATION, Tokyo (JP)

(72) Inventors: Steven Martin Richman, San Diego, CA (US); Brant Candelore, San Diego, CA (US); Graham Clift, Poway, CA (US); Kazumoto Kondo, San Diego, CA (US); Frederick Zustak, Poway, CA (US)

(73) Assignee: SONY CORPORATION, Tokyo (JP)

(*) Notice: Subject to any disclaimer, the term of this patent is extended or adjusted under 35 U.S.C. 154(b) by 606 days.

(21) Appl. No.: 13/794,222

(22) Filed: Mar. 11, 2013

(65) Prior Publication Data

US 2014/0253801 A1   Sep. 11, 2014

(51) Int. Cl.
| | |
|---|---|
| *H04N 5/445* | (2011.01) |
| *H04N 21/431* | (2011.01) |
| *H04N 21/443* | (2011.01) |
| *H04N 21/462* | (2011.01) |
| *H04N 21/485* | (2011.01) |

(52) U.S. Cl.
CPC ..... *H04N 5/44591* (2013.01); *H04N 21/4312* (2013.01); *H04N 21/4438* (2013.01); *H04N 21/4622* (2013.01); *H04N 21/4858* (2013.01)

(58) Field of Classification Search
None
See application file for complete search history.

(56) References Cited

U.S. PATENT DOCUMENTS

| | | | |
|---|---|---|---|
| 5,712,995 A * | 1/1998 | Cohn | 715/792 |
| 8,149,335 B2 * | 4/2012 | Sudo et al. | 348/569 |
| 2004/0056894 A1 * | 3/2004 | Zaika et al. | 345/762 |
| 2011/0289438 A1 * | 11/2011 | Hwang et al. | 715/764 |
| 2012/0169934 A1 * | 7/2012 | Putterman et al. | 348/565 |

* cited by examiner

*Primary Examiner* — Paulos M Natnael
*Assistant Examiner* — Samira Monshi
(74) *Attorney, Agent, or Firm* — John L. Rogitz

(57) ABSTRACT

A UHD display presents multiple video windows and a control device enables a user to establish the layout of the windows, either by selecting from templates of predetermined layouts or by constructing a custom layout. The UHD display can communicate messages to the control device if a particular layout fails to conform to predetermined rules depending on the types of applications to be presented in the various windows.

5 Claims, 4 Drawing Sheets

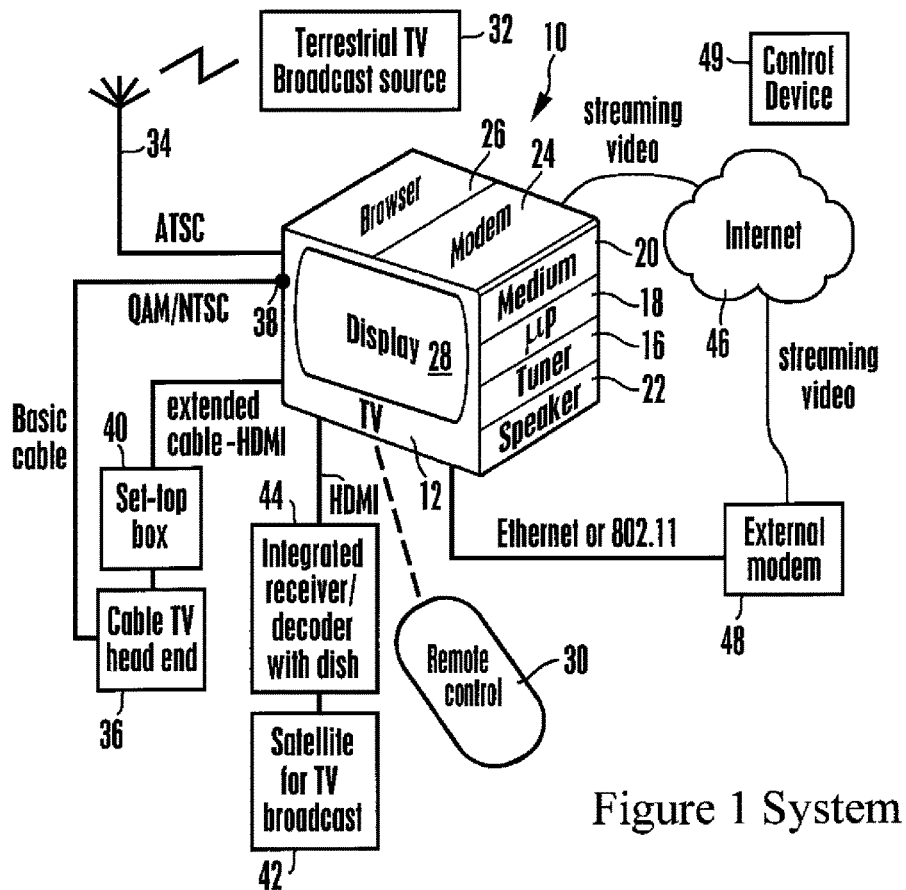
Figure 1 System
Figure 2 TV
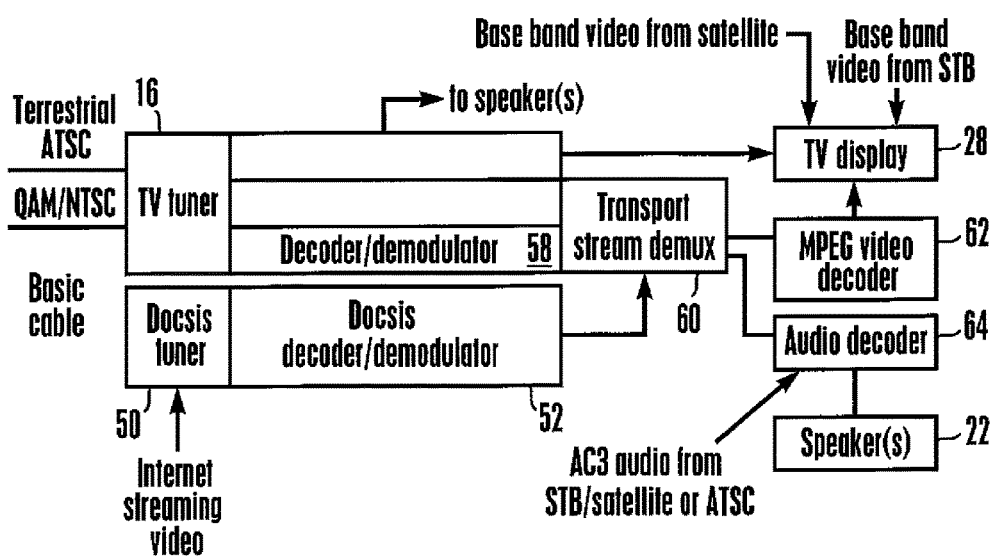

MANAGING EXTRA SPACE ON ULTRA HIGH DEFINITION DISPLAY PRESENTING HIGH DEFINITION VIDEO

FIELD OF THE INVENTION

The present application relates generally to managing extra space on ultra high definition (UHD) displays when the UHD displays present high definition (HD) video.

BACKGROUND OF THE INVENTION

High Definition (HD) displays have been introduced which have greater resolution than standard definition (SD) displays. This is achieved by increasing the pixel density from the standard 640 or 720 pixels per line, with 480 lines (720×480), to the HD 1920×1080 (for progressive and interlaced scans) 1440×1080 (for older interlaced scans). The greater resolution produces a clearer, more detailed visual presentation.

Recently, ultra high definition (UHD) displays have been introduced with even greater resolution than HD. As understood herein, owing to the paucity of programming available for UHD, current UHD displays present HD video which is simply upscaled to fill the entire display. This approximation to true UHD, however, may undesirably cause image artifacts to appear. As understood herein, there are more advantageous ways to exploit the improved capability of UHD displays.

SUMMARY OF THE INVENTION

A control device for controlling a display, such as a TV display in one example, that is configured for presenting video in at least first and second regions on the TV simultaneously includes a processor configured for controlling a display, a transceiver controlled by the processor to send signals to the TV, and a computer readable storage medium bearing instructions executable by the processor to present on the display at least first second images of respective first and second window layouts. The first window layout arranges at least first and second windows in a first configuration, while the second window layout arranges the first and second windows in a second configuration. The processor, responsive to receipt of a user selection of the first image, sends a signal to the TV to arrange content according to the first configuration, and responsive to receipt of a user selection of the second image, sends a signal to the TV to arrange content according to the second configuration.

In example embodiments the TV is an ultra high definition (UHD) display configured for presenting video in 2160 pixel lines or 4320 pixel lines, and the control device is embodied as a tablet computer. If desired, the processor may be further configured to present a modification UI on the display to allow the user to command the TV to alter a configuration of a window layout. The modification UI permits a user to resize a window on the modification UI. The processor can be configured to send to the TV a re-size command to cause the TV to resize its windows to mirror the modification UI.

In another aspect, a method includes presenting on a display of a control device first and second window layouts, with each layout including plural windows. The method also includes receiving a user selection of the first window layout, and responsive to the user selection of the first window layout, sending a command to a TV to present content in plural windows according to the first window layout.

In another aspect, an ultra high definition (UHD) display device includes a UHD display configured for presenting first and second video contents in respective first and second windows of the display. A processor is configured for controlling the UHD display to present demanded images. The processor is configured for receiving a user command to launch an application for presentation on the TV, and comparing the command against a set of presentation rules to determine if an application window representing the application can be added to the TV display without violating one or more of the presentation rules. Responsive to a determination that the application window representing the application can be added to the TV display without violating one or more of the presentation rules, the application window is presented on the TV. On the other hand, responsive to a determination that the application window cannot be added to those already being presented on the TV display without violating one or more presentation rules, the presentation rules are accessed to determine an alternate action.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a block diagram of an example TV;

DETAILED DESCRIPTION OF THE PREFERRED EMBODIMENT

Figure 3:
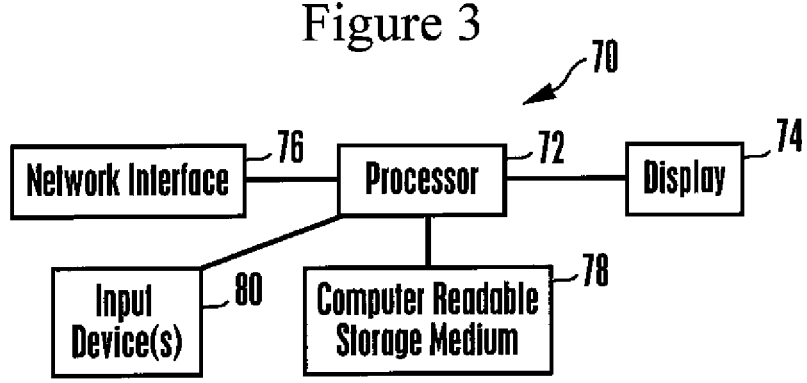
FIG. 3 is a block diagram of an example control device embodied as a tablet computing device.

Referring initially to the non-limiting example embodiment show in FIG. 1, a system 10 includes an audio video device such as a TV 12 including a TV tuner 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 12 which may execute a software-implemented browser 26. Video is presented under control of the TV processor 18 on a TV display 28 which according to present principles is an ultra high definition (UHD) display such as a flat panel display. The display 28 may be a 2160 p (progressive scan) display with a resolution of 3840×2160 pixels (for 4K UHD) or 4320 p (progressive scan) display with a resolution of 7860×4320 pixels (for 8K UHD). Frame rates for the UHD display 28 can be 24, 25, 50, 60, or 120 frames per second. These are exemplary numbers only.

User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

A control device 49 may be in wired or wireless communication with the TV 12 for purposes divulged further below. Further details of an example control device 49 are discussed in relation to FIG. 3.

But first, FIG. 2 shows details of an example TV 12. As shown, the terrestrial signal in ATSC format is input to the TV tuner 16, as is basic cable in NTSC or QAM format in the event that basic cable is used and the wall cable plugged into the F-type connector 38. On the other hand, streaming Internet video may be received at a DOCSIS tuner 50 and demodulated/decoded at a DOCSIS decoder/demodulator 52. Typically, the DOCSIS components are housed separately from the TV 12 but in some embodiments may be included in the chassis of the TV 12.

The output of the tuner 16, depending on the signal format received, may be sent to an appropriate decoder/demodulator 58 the output of which typically is sent to a transport stream demultiplexer 60, which separates the desired program from other programs in the selected stream and sends the desired program to an MPEG video decoder 62, which in turn uncompresses the MPEG desired program and sends the uncompressed program to the TV display 28 for presentation. Audio from the demultiplexer 60 may be sent to an audio decoder 64 which in turn sends the decoded audio to the speakers 22 for presentation.

In contrast to the sequence of decoder/demodulators, demultiplexer, and MPEG decoders discussed above, video from either the STB 40 or IRD 44 is in baseband HDMI when it is received by the TV 12. Accordingly, the signals from the STB 40 or IRD 44 are sent directly to the TV display 28 for presentation without further video decompression between the STB 40 or IRD 44 and TV display 28. Audio from the STB 40 or IRD 44 may still be in a format, e.g., AC3, that requires decoding prior to play on the speakers 22 so the audio may be sent through the audio decoder 64 as shown. Likewise, audio from the ATSC terrestrial source 32 may be in AC3 format and so may be sent through the audio decoder 64. Internet video from the DOCSIS decoder/demodulator 52 may be sent through the demultiplexer 60 and decoders 62, 64 as shown.

Note that the TV processor may execute hypertext markup language 5 (HTML5) to execute one or more software agents to control window displays according to disclosure herein.

Now referring to FIG. 3, an example control device is shown embodied as a tablet computer 70 with one or more processors 72 controlling one or more video displays 74 such as touch screen displays. The processor can communicate with the TV 12 direct (point to point) or over a network (such as a home entertainment network or the Internet) using one or more network interfaces 76 such as WiFi transceivers, Bluetooth transceivers, wireless telephony transceivers, wired modems, etc. The processor 72 can access one or more computer readable storage media 78 such as disk-based or solid state storage to execute logic described below, and can receive user commands (in addition to touch signals on the display 74) from input devices 80 such as keypads, keyboards, mice, etc. Other instantiations of control devices may be used, e.g., wireless telephones, ebooks, personal digital assistants, portable computers in general.

Figure 4:
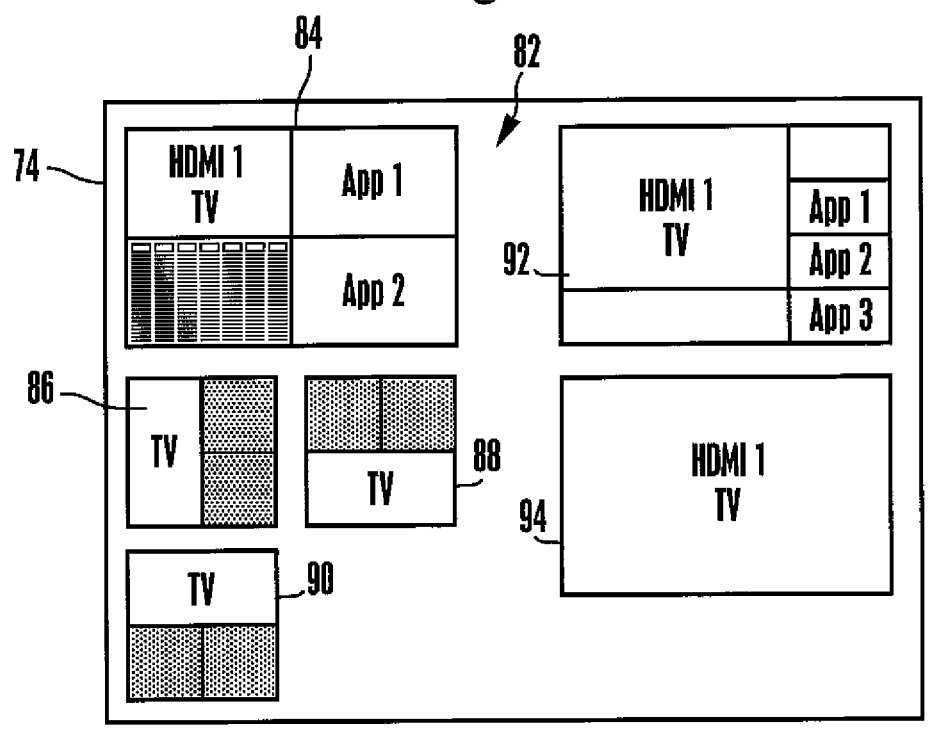
FIG. 4 is a screen shot of an example user interface (UI) that can be presented on the control device to select a window layout on the TV.

FIG. 4 shows a UI 82 that can be presented on the display 74 of the control device 49. Note that the UI 82 may be part of a control application executed by the processor of the control device 49. If the control device 49 does not have an application for executing the principles discussed herein, it downloads one (usually responsive to a user command to do so) from a source of applications, typically an Internet server. The application contains instructions regarding the UIs to be presented on the control device. For example, a user may enter a model number, serial number, or other identification of the TV 12 to obtain in response an application tailored for the video region layout(s) of that TV. The application contains information as to the number and configuration of the various video regions of the TV as well as other control options discussed herein.

As shown, the UI 82 may present plural images of various window layout options from which a user may select by, e.g., touching the desired layout or selecting the layout using a point and click device. Essentially, each window layout option establishes a template for a window layout on the TV 12. In response to selecting a layout on the control device 49, a command is sent from the control device 49 to the TV 12 to command the TV 12 to implement the selected layout on the display of the TV 12.

In the non-limiting example shown, a first window layout image 84 shows a simple quadrant-based layout in which TV programming is to be rendered in an upper left quadrant, first and second computer applications rendered in the two right quadrants, and an electronic program guide (EPG) is to be rendered in the lower left quadrant.

A second window layout image 86 may indicate to the user that TV programming is to be presented in the left half of the display while first and second applications are to be presented in the upper right and lower right quadrants, respectively, of the display. Note that the right-hand quadrants representing applications may contain the word "application" or "app" or may be simply shaded without alphanumeric indication.

A third window layout image 88 may indicate to the user that TV programming is to be presented in the lower half of the display while first and second applications are to be presented in the upper left and upper right quadrants, respectively, of the display. Yet again, a fourth window layout image 90 may indicate to the user that TV programming is to be presented in the upper half of the display while first and second applications are to be presented in the lower right and upper right quadrants, respectively, of the display.

In the non-limiting example shown, a more complex window layout image 92 indicates that in this layout, TV programming is presented in the upper left portion of the display to cover over half of the total display area as shown. A bottom pane extends across the length of the TV programming window and four application panes are aligned vertically along the right side of the display as shown. Yet again, the user may be allowed to select a window layout image 94 in which TV programming is presented on the entire display. The UI 82 may be invoked if desired at any time to allow the user to switch from one window layout on the TV display to another layout.

Figure 5:
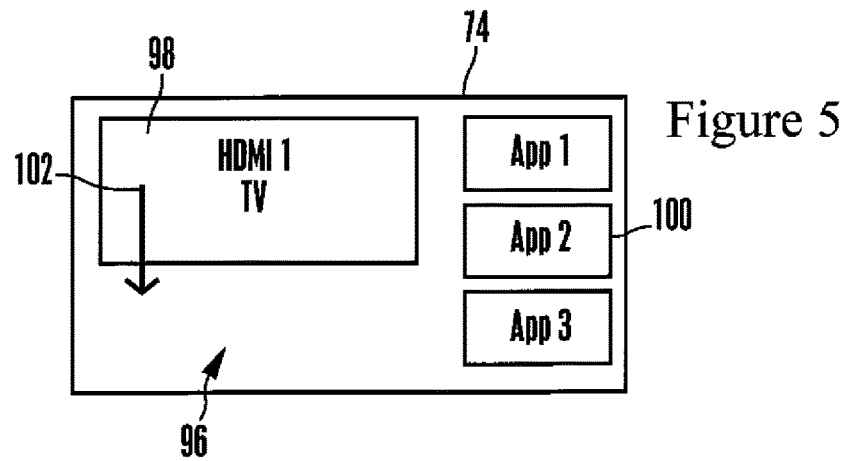
FIGS. 5 and 6 are screen shots of UIs that can be presented on the control device to re-size windows on the TV.
Figure 6:
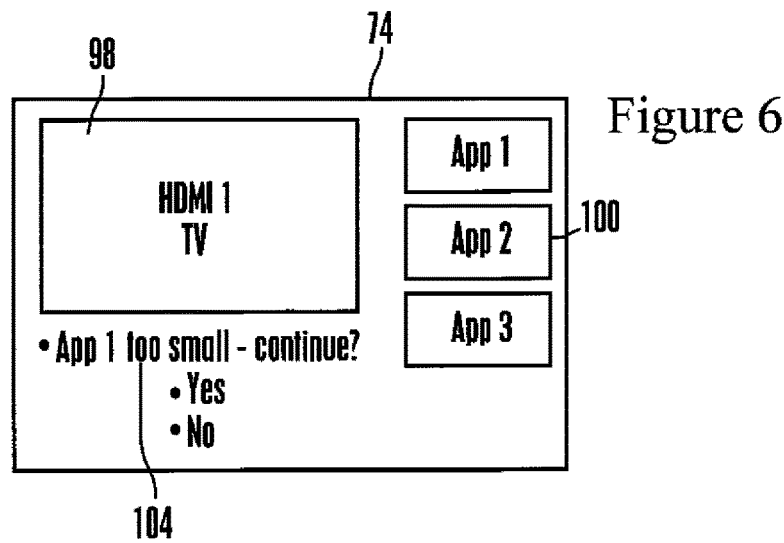

FIGS. 5 and 6 illustrate a UI 96 that can be presented on the display 74 of the control device 49 to allow the user to command the TV 12 to alter the configuration of a window layout, either one selected by the user as above, one created by the user, or one preset by the manufacturer of the TV 12. In FIG. 5 a TV programming window 98 is presented in the upper left portion of the TV display as indicated by the template shown on the display 74 of the control device 49. Also, three application windows 100 are arranged in a column along the right side of the display next to the TV programming window. As indicated by the arrow 102, the user has sought to enlarge the TV programming window, by, e.g., sliding a finger against the display 74 in the direction of the arrows 10, or by dragging and dropping a corner of the window 98 in the direction of the arrow 102.

In any case, the result is shown in FIG. 6, in which the TV programming window 98 has been enlarged compared to FIG. 5 in the vertical dimension relative to the display. This in turn has caused the control device processor to correspondingly shrink the application windows 100 as needed to accommodate the larger TV programming window 98 as shown.

A re-size command may be sent from the control device to the TV to cause the TV to resize its windows to mirror FIG. 6. In some cases and as more fully discussed below, depending on display rules that in turn can depend on application type and/or content type, the re-sizing of some windows may be determined to violate the rules. For example, rules may dictate a minimum size for one application window 100 but not for another application window 100 based on the different nature of the applications, e.g., text versus video.

Assume for exposition that the re-sizing operation illustrated in FIGS. 5 and 6 has violated one or more rules, as determined by the TV and signaled to the control device or as determined by the control device itself. In such a case a message 104 may be caused to appear which alerts the user that the desired larger size of the TV programming window 98 results in the application "1" window 100 being too small. The message may also give the user the option to continue to implement the larger TV programming window 98, overriding the rule, or to accept the rule, in which case the UT 96 returns to the original UI 96 shown in FIG. 5, and no change is made to the window layout on the TV. As an alternative, the control device 49 may simply shrink the size of the TV programming window 98 from its larger version in FIG. 6 toward the original, smaller version in FIG. 5 only until the correspondingly application "1" window grows large enough to satisfy the rule, in effect giving the user a TV programming window 98 as large as possible in response to the attempt to re-size the window 98 that, while not being as large as originally commanded by the input motion 102, is larger than the original size shown in FIG. 5.

Figure 7:
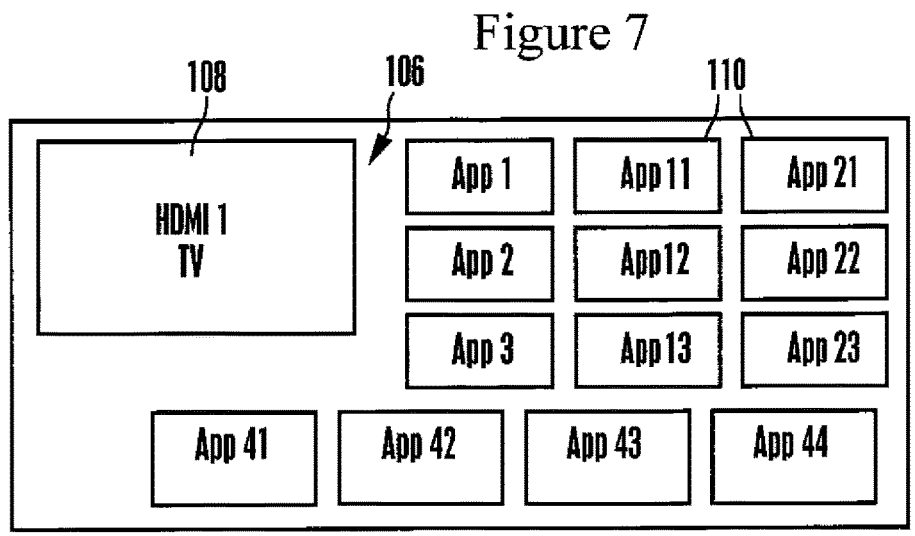
FIG. 7 is a UI showing grouping of application icons by type.

Before turning to FIG. 7, it is first noted that it can be difficult for a user of a television to organize icons or windows on screen, as with a multi-windows TV with a large number of inputs and simultaneous decoding capability. The user may be faced with how to organize the applications, applications, windows or canvases on-screen.

Accordingly, as shown in FIG. 7, application icons and windows on a myriad of different possible content can be organized depending on user preferences which relate to the nature and type of content that is presented, and also whether the windows are synchronized with each other. In some example embodiments each icon, application, window or canvas can be categorized as (1) online movie services; (2) online and televised news media sources including podcasts; (3) video game applications; (4) productivity applications including word processing applications, spreadsheets applications, slide show applications, etc.; (5) advertisement content; (6) personalized user content, e.g., user-generated photos, videos, etc.; (7) shopping applications; (8) social network applications; (9) messaging applications including email and short message applications; and (10) data storage applications.

In the embodiment shown in FIG. 7, the control device display 74 presents a template that mirrors a current windows layout on the TV. Thus, the TV shares its state information with the control device. The windows layout may not be according to a predefined template but instead may be created on the fly as new applications are invoked or old applications are closed by the user. Rules, described below, for doing this may be implemented. The rules may define sorting applications by category, size, content, etc.

As shown, TV programming is indicated as being shown in a relatively large TV window 108. Also, plural application icons or windows 110 are presented, each representing a respective application. In the implementation shown the application windows 110 represent applications that have been invoked for display by a user and that are automatically sorted to be presented with other like applications. In another implementation the application windows 110 represent applications that are available for execution on the TV 12 regardless of whether the user has currently invoked them. In any case, the sorting may be accomplished using metadata accompanying each application that identifies the category of application.

For illustration assume that all application windows depicted in FIG. 7 by a single digit are one type of application, e.g., are all online movie services. Note that these applications are grouped together automatically by the TV processor on the TV display (and hence so reflected on the UI of FIG. 7) in a column. Thus, when the application windows 110 represent applications that have been invoked for display by a user, as each one is invoked it is automatically placed adjacent to windows or icons of like applications as shown. Within the column, the application windows of the same type may be further sorted by name, e.g., alphabetically.

Next, assume that all application windows depicted using digits in the teens are all of another type of application, e.g., are all online and televised news media sources. These applications likewise are grouped together on screen in a column. Next, assume that all application windows depicted using digits in the twenties are all of another type of application, e.g., are all video game applications. These applications likewise are grouped together on screen in a column. Finally, assume that applications grouped in larger windows in a bottom row which are depicted using digits in the forties are yet a fourth type of application, e.g., all are productivity applications such as word processing applications, spreadsheets applications, slide show applications.

In some embodiments the control device may be used to select one of the application windows 110 to move that application to the larger window 108, replacing the TV programming or in other embodiments overlaying the TV programming. A menu or other selector may be presented to allow the user to decide whether to replace or overlay upon selection. When the TV programming is replaced in the larger window 108 it may be moved into the smaller application window 110 from whence the selected application came.

In some embodiments the user may be given the option of moving a group of applications of the same type to a different part of the screen, e.g., to swap the locations of the windows 110 depicted by numerals in the teens with those of windows 110 depicted by numerals in the twenties. This can be done by, for example, dragging and dropping one column into a new location which causes the column in the target location to be moved to the source location of the dragged and dropped column. Or, some windows 100 may be overlaid on other windows 100 to occlude the underlying windows, with the "top" window being partially transparent if desired so that the bottom window is only partially occluded.

Figure 8:
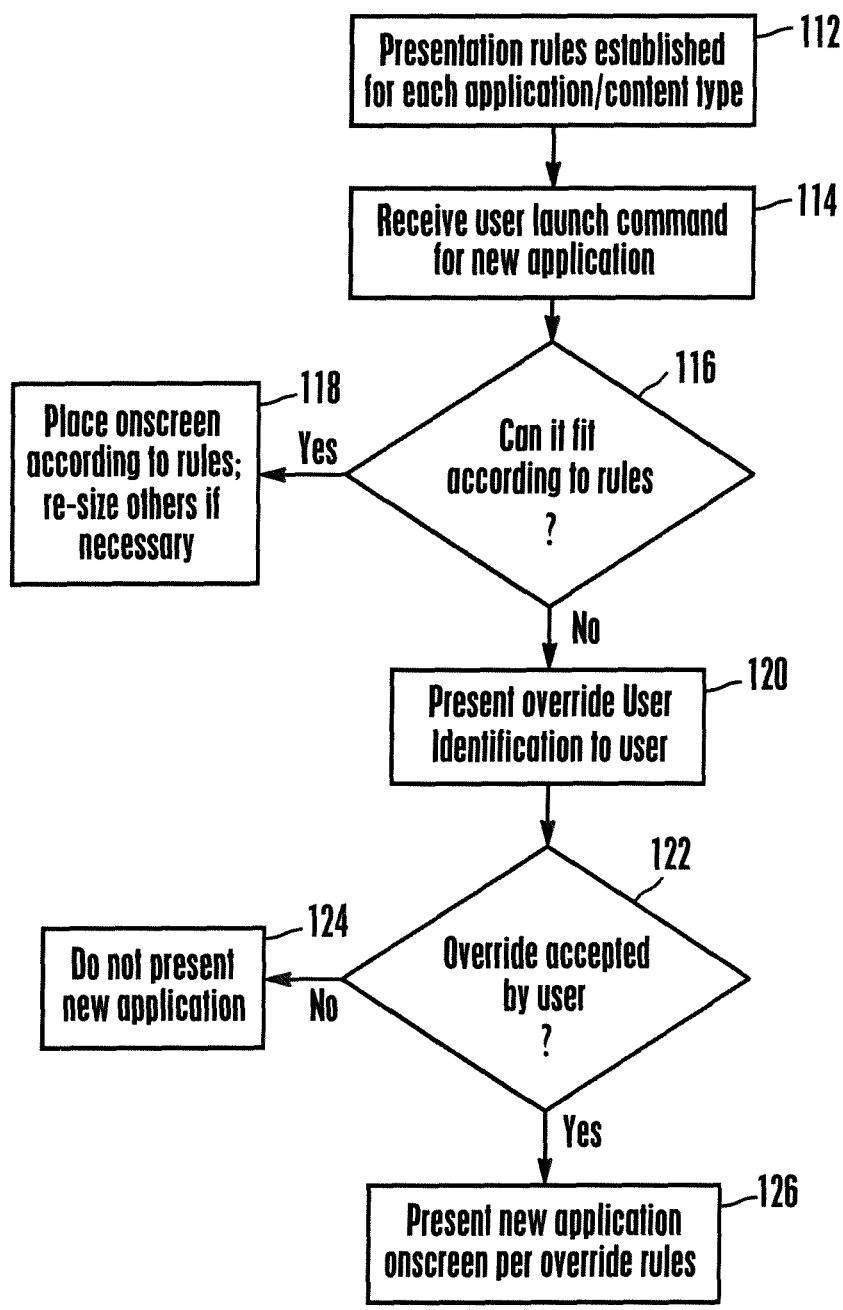
FIG. 8 is a flow chart showing example logic for using state information from the TV to aid a user of the control device in establishing screen layouts.

FIG. 8 illustrates logic that is related to disclosure above. Commencing at block 112 presentation rules are established for each application/content type. Example rules include showing productivity applications in larger windows than video-related windows to enable the user to better discern text, replacing an older application window with a newer application upon invocation of the newer application responsive to a determination that the available space on the TV display has already been maximized with application windows and a TV programming window and/or responsive to a determination that the older application is of a first category, overlaying an older application window with a newer application upon invocation of the newer application responsive to a determination that the available space on the TV display has already been maximized with application windows and a TV programming window and/or further responsive to a determination that the older application is of a second category different from the first category. It will thus be appreciated that some, but not all, application types can be defined to have their windows be overlaid by other application windows.

Additional example rules include how much to shrink an application window when necessary to place a newly invoked application window on the display, with the amount of maximum shrinkage varying if desired according to application type. Still other rules may be to allow the user to override a message that a maximum shrinkage will be experienced if a new application window is opened, to not allow the user to override a message that a maximum shrinkage will be experienced if a new application window is opened, and a mixture of these two rules depending on application category.

Yet again, other rules may be to reposition one or more application windows if adding a new window would result in shrinking an existing window beyond maximum. Or, a rule may be to overlay a new application window onto an existing application if the existing application window is of a particular category or categories but not if the window is in a "no not overlay" category.

Block 114 indicates that a user command is received, via the control device 49 if desired, to launch an application for presentation on the TV. The command may be invoked using the TV itself when, for example, the TV display is a touch screen display.

Decision diamond 116 indicates that the TV (or in some embodiments the control device 49) compares the command against the set of rules generated at state 112 to determine if an application window can be added to those already being presented on the TV display without violating one or more presentation rules. If it can, at block 118 an application window in which the application is shown executing is opened and positioned on the TV display according to the rules discussed previously, e.g., is opened adjacent application windows of other applications of the same category as the newly invoked application, sorted within the same category as desired. Other windows may be shrunk if necessary according to the rules above.

On the other hand, responsive to a determination at decision diamond 116 that an application window cannot be added to those already being presented on the TV display without violating one or more presentation rules, the logic proceeds to block 120 to, if desired, present the above-discussed option for the user to override the rules. If the user does not accept an override option as indicated at decision diamond 122, the logic moves to block 124 to not present the newly invoked application or to present it but in a way that overlays or replaces or otherwise affects, according to the presentation rules, one or more existing application windows. In contrast, if the user decides to override the rules the logic moves to block 126 to present the application on the TV display, according to special override rules that may be similar to some of those above, e.g., by replacing an existing window or by overlaying the new window on top of an existing window.

While the particular MANAGING EXTRA SPACE ON ULTRA HIGH DEFINITION DISPLAY PRESENTING HIGH DEFINITION VIDEO is herein shown and described in detail, it is to be understood that the subject matter which is encompassed by the present invention is limited only by the claims.

What is claimed is:
1. An ultra high definition (UHD) display device (UHDDD) comprising:
   a UHD display configured for presenting first and second video contents in respective first and second windows of the display; and
   a processor configured for controlling the UHD display to present demanded images, the processor configured for:
   receiving a user command to launch an application for presentation on the UHDDD;
   comparing the command against a set of presentation rules to determine if an application window representing the application can be added to the UHDDD without violating one or more of the presentation rules;

responsive to a determination that the application window representing the application can be added to the display without violating one or more of the presentation rules, presenting on the UHDDD the application window; and responsive to a determination that the application window cannot be added to those already being presented on the UHDDD without violating one or more presentation rules, accessing the presentation rules to determine an alternate action, wherein the application is a first application and wherein the processor is configured for, responsive to a determination that the application window representing the application can be added to the UHDDD without violating one or more of the presentation rules, presenting on the UHDDD the application window, the application window is grouped with application windows representing existing applications in the same category as the first application.

2. An ultra high definition (UHD) display device (UHDDD) comprising:

a UHD display configured for presenting first and second video contents in respective first and second windows of the display; and a processor configured for controlling the UHD display to present demanded images, the processor configured for:

receiving a user command to launch an application for presentation on the UHDDD;

comparing the command against a set of presentation rules to determine if an application window representing the application can be added to the UHDDD without violating one or more of the presentation rules;

responsive to a determination that the application window representing the application can be added to the display without violating one or more of the presentation rules, presenting on the UHDDD the application window; and responsive to a determination that the application window cannot be added to those already being presented on the UHDDD without violating one or more presentation rules, accessing the presentation rules to determine an alternate action, wherein the alternate action is presenting on a user interface (UI) an option for a user to override the rules.

3. The UHD display device of claim 1, wherein the alternate action is presenting the application window in a way that overlays, according to the presentation rules, one or more existing application windows.

4. The UHD display device of claim 1, wherein the alternate action is presenting the application window in a way that replaces, according to the presentation rules, one or more existing application windows.

5. The UHD display device of claim 1, wherein the alternate action is presenting the application window in a way that resizes, according to the presentation rules, one or more existing application windows.

* * * * *